(12) United States Patent
Menzel et al.

(10) Patent No.: US 7,169,322 B2
(45) Date of Patent: *Jan. 30, 2007

(54) AQUEOUS DISPERSION, PROCESS FOR ITS PRODUCTION AND USE

(75) Inventors: Frank Menzel, Hanau (DE); Wolfgang Lortz, Waechtersbach (DE); Helmut Mangold, Rodenbach (DE)

(73) Assignee: Degussa AG, Duesseldorf (DE)

( * ) Notice: Subject to any disclaimer, the term of this patent is extended or adjusted under 35 U.S.C. 154(b) by 531 days.

This patent is subject to a terminal disclaimer.

(21) Appl. No.: 10/078,373

(22) Filed: Feb. 21, 2002

(65) Prior Publication Data

US 2002/0121156 A1  Sep. 5, 2002

(30) Foreign Application Priority Data

Feb. 22, 2001  (EP) .................. 01104269

(51) Int. Cl.
- *C09K 13/00* (2006.01)
- *C09K 3/14* (2006.01)
- *C09G 1/02* (2006.01)
- *C01B 33/193* (2006.01)
- *H01L 21/302* (2006.01)

(52) U.S. Cl. .............. 252/79.1; 252/79.5; 106/3; 106/287.34; 106/442; 106/447; 106/482; 106/489; 438/691; 438/693; 423/335; 428/403; 428/404; 51/307; 516/86; 516/93; 501/128

(58) Field of Classification Search ................ 252/79.1, 252/79.4, 79.5; 106/3, 442, 287.34, 482, 106/489; 438/689, 690, 691, 692, 693; 428/403, 428/404; 423/335; 241/184

See application file for complete search history.

(56) References Cited

U.S. PATENT DOCUMENTS

| | | | |
|---|---|---|---|
| 5,382,272 A | 1/1995 | Cook et al. | |
| 5,407,615 A | 4/1995 | Norville | |
| 5,783,489 A * | 7/1998 | Kaufman et al. | 438/692 |
| 5,804,513 A * | 9/1998 | Sakatani et al. | 438/693 |
| 5,858,813 A | 1/1999 | Scherber et al. | |
| 5,891,205 A | 4/1999 | Picardi et al. | |
| 5,954,997 A | 9/1999 | Kaufman et al. | |
| 6,048,577 A | 4/2000 | Garg | |
| 6,294,106 B1 * | 9/2001 | Pryor | 252/79.1 |
| 6,375,693 B1 * | 4/2002 | Cote et al. | 51/308 |
| 6,455,455 B1 * | 9/2002 | Deller et al. | 501/153 |
| 6,620,508 B2 * | 9/2003 | Inoue et al. | 428/403 |
| 2001/0042493 A1 * | 11/2001 | Scharfe et al. | 106/482 |
| 2003/0095905 A1 * | 5/2003 | Scharfe et al. | 423/327.1 |

FOREIGN PATENT DOCUMENTS

| | | | |
|---|---|---|---|
| CA | 2285792 | | 4/2000 |
| CA | 2307057 | | 10/2000 |
| DE | 198 47 161 | | 4/2000 |
| DE | 198 47 161 A1 | | 4/2000 |
| EP | 0 773 270 A2 | | 5/1997 |
| EP | 0 876 841 A1 | | 11/1998 |
| EP | 1 048 617 | | 11/2000 |
| EP | 1 048 617 A1 | | 11/2000 |
| EP | 1 065 251 A1 | | 1/2001 |
| GB | 2 063 695 | | 6/1981 |
| JP | 2000-109810 | * | 1/2000 |
| JP | 2000-109810 | * | 4/2000 |
| JP | 2000-133621 | * | 5/2000 |
| JP | 2000-265161 | * | 9/2000 |
| KR | WO 00/17282 | * | 3/2000 |
| WO | 99/05232 | | 2/1999 |
| WO | 00/17282 | | 3/2000 |
| WO | WO 01/25366 A1 | | 4/2001 |

OTHER PUBLICATIONS

Ullmann's Enz. tech. Chem., 4th Ed., vol A23, pp. 694-696.

* cited by examiner

*Primary Examiner*—Mark Kopec
*Assistant Examiner*—Kallambella Bijayakumar
(74) *Attorney, Agent, or Firm*—Oblon, Spivak, McClelland, Maier & Neustadt, P.C.

(57) ABSTRACT

Aqueous dispersion containing a silicon-aluminum mixed oxide powder, the powder containing 0.1 to 99.9 wt. % $Al_2O_3$ and Si—O—Al-bonds. The dispersion can be produced using dispersing and/or grinding devices which a achieve an energy input of at least 200 KJ/m$^3$. The dispersion can be used for the chemical-mechanical polishing of semiconductor substrates.

2 Claims, No Drawings

AQUEOUS DISPERSION, PROCESS FOR ITS PRODUCTION AND USE

BACKGROUND OF THE INVENTION

1. Field of the Invention

This invention relates to aqueous dispersions containing a silicon-aluminium mixed oxide powder, a process for its production as well as its use for polishing semiconductor substrates.

2. Discussion of the Background

Chemical-mechanical polishing (CMP process) is a technique which is used for planing surfaces and for producing structures in the submicrometer range on semiconductor wafers. Here, a dispersion is used which contains a chemically active compound as well as an abrasive. The latter is of particular importance, as it is to have a high rate of surface removal, without scratching the surface being polished.

It has now become apparent that, depending on the polishing operation involved, it can be useful to employ physical mixtures of abrasive particles and thus to combine the advantages of both components of the mixture.

U.S. Pat. No. 5,891,205 describes a dispersion for use in the CMP process, which contains as an abrasive a physical mixture of cerium oxide and silicon dioxide. Here, the term "physical" means that the dispersion contains particles of cerium oxide and particles of silicon dioxide as separate compounds.

U.S. Pat. No. 5,382,272 likewise describes a physical mixture of cerium oxide particles and silicon dioxide particles; here, an adsorption of the cerium oxide particles onto the silicon dioxide particles is reported to lead to a positive effect during chemical-mechanical polishing. In this connection, a frequent problem is that important variables such as, for example, the particle sizes and the performance within different pH ranges, are not compatible. The result of this is that the anticipated effect is already frustrated at the preliminary stage, if a stable aqueous dispersion cannot be produced from different particles.

The use of chemical mixtures of metal oxides or non-metal oxides has been described in various patents. Thus, for example, U.S. Pat. Nos. 5,858,813 and 5,954,997 describe the use of chemical mixtures of oxides in the CMP process. The chemical mixtures described in these documents, compared with abrasives consisting of only one type of molecule, show no differences with regard to their polishing performance. This means that a specific polishing effect, which would be achieved, for example, using silicon dioxide or aluminium oxide, can alternatively also be attained using the mixed oxides described in these documents.

WO 9905232 A1 describes, in connection with a CMP dispersion, the production of silicon dioxide using a doping agent. It is reported that the hardness of the abrasive particles during the chemical-mechanical polishing process can be varied as a result of the doping. The disadvantage is that the doping agent can be added only within a very narrow range, and so the effect during the chemical-mechanical polishing is only slight.

There is thus a lively interest in the use of mixed oxides in chemical-mechanical polishing. Hitherto, however, there has been no, or only limited, success in demonstrating the advantages of a chemical mixed oxide in chemical-mechanical polishing. This is also to be attributed to the fact that in the patent literature known hitherto, the particles suspended in the dispersion have been described not at all, or only inexactly. Hence consistent reproducible polishing effects cannot be expected either.

SUMMARY OF THE INVENTION

The object of this invention is to provide an aqueous dispersion which contains as an abrasive a mixed oxide consisting of exactly defined particles.

DESCRIPTION OF THE PREFERRED EMBODIMENTS

The invention provides an aqueous dispersion containing a silicon-aluminium mixed oxide powder characterised in that the powder contains 0.1 to 99.9 wt. % $Al_2O_3$ and that the powder possesses a structure containing Si—O—Al-bonds and amorphous and/or crystalline silicon dioxide regions and crystalline aluminium oxide regions.

Preferred aqueous dispersions are those which contain powder consisting of primary particles of amorphous silicon dioxide and crystalline aluminium oxide obtained from a flame hydrolysis process.

The production of these particles has already been described in EP-A 1048617, incorporated herein by reference. Silicon halide and aluminium halide are vaporised in a given ratio to one another and, with a carrier gas, are homogeneously mixed with air, oxygen and hydrogen in a mixing unit, this mixture is burnt in a burner of known construction and, after the separation of the solids from the vapour phase, in a further processing step any traces of halides possibly adhering to the product are removed by means of moist air at elevated temperature.

The dispersion may also contain a silicon-aluminium mixed oxide having a mullite structure, with the chemical composition 3 $Al_2O_3 \times 2$ $SiO_2$ up to 2 $Al_2O_3 \times SiO_2$. The synthesis of these particles is published in Ullmanns Enzyklopädie der technischen Chemie, 4th Edition, Volume A 23, p. 694, incorporated herein by reference.

The aqueous dispersion may also contain silicon dioxide particles produced in a flame hydrolysis process and doped with aluminium oxide by means of an aerosol, which are obtainable by means of the method of spray doping, as described in DE-A-19847161, incorporated herein by reference.

The pyrogenically produced silicon dioxide doped with aluminium oxide by means of an aerosol is produced by introducing an aerosol into a flame of the type used for the pyrogenic production of silica by flame oxidation or preferably by flame hydrolysis, homogeneously mixing the aerosol, prior to the reaction, with the gas mixture of the flame oxidation or flame hydrolysis, then allowing the aerosol-gas mixture to react in the flame and separating the resulting pyrogenically produced silicon dioxide doped with aluminium oxide from the gas flow in known manner. Here, in order to produce the aerosol, an aqueous solution containing salts or salt mixtures of aluminium, or the actual metal in dissolved or suspended form, or mixtures of these, is used. The salts used can be $AlCl_3$, $Al_2(SO_4)_3$, $Al(NO_3)_3$.

The invention also includes the similarly producible aluminium oxide particles doped with silicon dioxide.

The dispersion may also contain silicon dioxide particles completely or partially coated with aluminium oxide, or aluminium oxide particles completely or partially coated with silicon dioxide, which are obtainable by calcination and grinding according to prior art.

In particular, the aqueous dispersion may also contain mixtures of two or more of the above-mentioned particles, namely, primary particles of amorphous silicon dioxide and crystalline aluminium oxide bonded together by Si—O—Al units, mullite structures having the chemical composition 3

Al$_2$O$_3$×2 SiO$_2$ up to 2 Al$_2$O$_3$×SiO$_2$, aluminium oxide doped with silicon dioxide, or silicon dioxide doped with aluminium oxide.

The crystalline aluminium oxide can be the modifications alpha-, gamma-, delta-, theta- and kappa-aluminium oxide, as well as pyrogenic aluminium oxide, named after the process for its production, and mixtures of the above-mentioned aluminium oxides.

In a preferred embodiment of the invention, the BET surface area of the silicon-aluminium mixed oxide particles in the dispersion is between 5 and 600 m$^2$/g. A range between 50 and 200 m$^2$/g is particularly preferred. The dispersion exhibits a good stability within this range.

The solids content of the dispersion containing the mixed oxide is determined primarily by the intended use. In order to save transport costs, a dispersion having as high a solids content as possible will be sought, whereas for certain applications, for example, in chemical-mechanical polishing, dispersions having a low solids content are used. According to the invention, a solids content of 0.1 to 70 wt. % is preferred. The range between 1 and 30 wt. % is particularly preferred. The dispersion exhibits a good stability within this range.

The pH value of the dispersion can be varied within a wide pH range of approximately 4 to 12.5 by the addition of basic or acidic substances. Basic substances used in particular are ammonia, potassium hydroxide and tetramethylammonium hydroxide. Acidic substances which can be used are inorganic mineral acids and carboxylic acids.

In addition, the dispersion according to the invention may also contain an oxidising agent which, in the chemical-mechanical polishing of metal coatings, serves to oxidise the metals to the corresponding oxides, which afterwards are mechanically removed. Oxidising agents which can be used are: hydrogen peroxide, hydrogen peroxide adducts, organic and inorganic peracids, imino peracids, persulfates, perborates, percarbonates, oxidising metal salts and/or mixtures of these.

The oxidising agent may be added to the dispersion immediately prior to the polishing process, in order thereby to minimise loss of the oxidising agent through decomposition caused by the particles of mixed oxide.

The dispersion according to the invention may also contain an oxidation activator, the purpose of which is to increase the rate of oxidation during chemical-mechanical polishing. The catalyst may act as an electron-transfer vehicle between the oxidising agent and the metal surface, or else form active species with the oxidising agent. An example of this is the formation of hydroxyl radicals or of percarboxylic acids from hydrogen peroxide. Suitable oxidation catalysts are the metal salts of Ag, Co, Cr, Cu, Fe, Mo, Mn, Ni, Os, Pd, Ru, Sn, Ti, V and mixtures of these. Carboxylic acids, nitrites, ureas, amides and esters are also suitable.

The dispersion according to the invention may also contain corrosion inhibitors. These are intended to inhibit the conversion of the metal surface into soluble compounds through corrosion and thus to preserve the metal surface for the oxidation of the metal into the metal oxide, which afterwards is mechanically removed by an abrasive. Suitable inhibitors include the nitrogen-containing heterocycles, such as benzotriazole, substituted benzimidazoles, substituted pyrazines, substituted pyrazoles and mixtures of these.

As some corrosion inhibitors may at the same time also decompose the oxidising agent, there is the possibility of adding the corrosion inhibitor just shortly before the dispersion is used.

Surface-active substances, which are of the non-ionic, cationic, anionic and/or amphoteric type, may be added to the dispersion in order to stabilise it further, for example, against sedimentation of the abrasive, flocculation, and the decomposition of the oxidising agent.

The particle size of the mixed oxide in the dispersion is preferably less than 150 nm. The range is particularly preferably less than 100 nm. Particles of this order of magnitude advantageously meet the increasingly rigorous standards of the semiconductor industry which, owing to the progressive miniaturisation of the components, is demanding extremely fine abrasive particles.

The invention also provides a process for producing the dispersion containing a silicon-aluminium mixed oxide, using dispersing and/or grinding devices which achieve an energy input of at least 200 KJ/m$^3$. These include systems based on the Rotor Stator principle, for example, Ultra Turrax machines, or agitated ball mills. Higher energy inputs are possible with the use of a planetary kneader/mixer. For this system to be efficient, however, the mixture being processed must have a viscosity high enough to produce the high shear energies required to disperse the particles.

Aqueous dispersions containing silicon-aluminium mixed oxide particles which are less than 150 nm, and preferably less than 100 nm, can be obtained by using high-pressure homogenisers.

In these devices, two previously dispersed flows of suspension under high pressure are expanded through a nozzle. The two jets containing the dispersions strike one another exactly and the particles are ground automatically. In another embodiment, the preliminary dispersion is likewise put under high pressure, but the collision of the particles is effected against armour-plated sections of the walls. The operation can be repeated any number of times in order to obtain smaller particle sizes.

A very finely divided dispersion having an average particle size $d_{50}$ of 90 nm was obtained by dispersing and grinding a 12.5 percent dispersion of a silicon-aluminium mixed oxide, which had been produced as in EP-A 1048617 and contained approximately 70 wt. % aluminium oxide, at a pH of 10.5 and at a pressure of 1500 kg/cm$^3$ and after passage through the dispersing device five times.

With the identical material, it was also possible to produce a very finely divided dispersion within the acid pH range. At a pH of 4, an average particle size $d_{50}$ of 118 nm was determined in the case of a 6 percent dispersion of a mixed oxide containing approximately 70 wt. % aluminium oxide, at a pressure of 1500 kg/cm$^2$ and after passage through the dispersing device three times.

When a doped silicon-aluminium mixed oxide, produced as in DE-A 19847161 and containing 0.25 wt. % aluminium oxide, based on the solid material, was used in a 25 percent aqueous dispersion at a pH of 10.5, an average particle diameter of 110 nm was determined.

These devices have hitherto been used only for dispersing chemically uniform oxides, such as zinc oxide, silicon dioxide, aluminium oxide (GB-A 2 063 695, EP-A 876 841, EP-A 773 270, WO 00/17 282 A1). The grinding and dispersion of mixed oxides, which form the basis of this invention, using these devices has not hitherto been described.

The invention also provides the use of the dispersion according to the invention for the chemical-mechanical polishing of semiconductor substrates and applied layers. The dispersion is particularly suitable for polishing oxide surfaces. The stability of the dispersion within the basic pH range even at high concentrations of aluminium oxide advantageously permits high rates of surface removal and a surface which is very largely free from microscratches.

The good stability of the dispersion according to the invention within the acid range advantageously enables metal coatings to be polished in the presence of further additives, such as oxidising agents and surface-active substances. Here it is apparent that the selectivity of aluminium metal coating/silicon dioxide surface, compared with a prior art dispersion, which contains only aluminium oxide instead of the silicon-aluminium mixed oxide, can be improved by up to a factor of 3. The use for polishing metal coatings which are applied to oxide surfaces is not limited to aluminium. The dispersion according to the invention is suitable for the chemical-mechanical polishing of metallic films containing aluminium, aluminium alloys, copper, copper alloys, tungsten, titanium, titanium nitride.

Moreover, the dispersions according to the invention are suitable for the production of very finely divided surface coatings in the paper industry or for the production of special glasses.

EXAMPLES

Analytical Technique

The average particle size (determined from the quantitative distribution) in the dispersion was determined using the Zetasizer 3000 Hsa from Malvern.

The BET surface area of the particles was determined in accordance with DIN 66131.

The viscosity of the dispersions produced was determined using a rotary rheometer from Physica, Model MCR 300, and a measuring cup CC 27. The viscosity number was determined at a shear rate of 500 l/sec. This shear rate is within a range in which the viscosity is virtually independent of the shear stress.

Production of the Particles

The silicon-aluminium mixed oxide containing 66 wt. % aluminium oxide which was used for Dispersions 1 to 3 was produced by the method described in EP-A 1048617. The silicon-aluminium mixed oxide containing 0.25 wt. % aluminium oxide which was used for Dispersion 4 was produced by the method described in DE-A 19847161.

Production of the Dispersions

Dispersion 1

29.0 kg deionised water and 90 g of 30 percent, aqueous KOH solution were placed in a 60 l stainless steel batch tank. 4.35 kg silicon-aluminium mixed oxide containing 66 wt. % aluminium oxide was absorbed and coarsely predispersed by means of a dispersing and suction mixer from Ystral, operating at 4500 rev/min. During the introduction of the powder, the pH value was maintained at approximately 10.5 by the addition of 30 percent, aqueous KOH solution. This preliminary dispersion was assisted by a Rotor/Stator continuous homogeniser, Type Z 66 (Ystral), having four working faces, a stator slot width of 1 mm and a speed of 3000 rpm. After the introduction of the powder, the dispersion was completed within 15 minutes, using the same homogeniser at a speed of 11,500 rpm. At the same time, the pH value was adjusted to and maintained at a pH value of 10.5 by the addition of a further 160 g of 30 percent, aqueous KOH solution. A solids concentration of 12.5 wt. % was established by the addition of 1.25 kg deionised water. The preliminary dispersion thus obtained was ground by means of a high-pressure homogeniser of the type Ultimaizer System, Model HJP-25050 (Sugino Machine Ltd.), at a pressure of 250 MPa, with a diamond-nozzle diameter of 0.3 mm and with two passages through the grinder.

A 12.5 percent by weight dispersion having a pH value of 10.5, a viscosity of 4 mPa·s and an average particle size $d_{50}$ of 90 nm was obtained.

Dispersion 2

The preparation was carried out as described for Dispersion 1, but using 34.75 kg deionised water and 5.00 kg of the silicon-aluminium mixed oxide containing 66 wt. % aluminium oxide, and without the addition of KOH solution.

A 12.5 percent by weight dispersion having a pH value of 4.5, a viscosity of 4 mPa·s and an average particle size $d_{50}$ of 118 nm was obtained.

After two weeks, the dispersion exhibited an average particle size $d_{50}$ of 250 nm and a slightly increased viscosity of 5 mPa·s.

Dispersion 3

The preparation was carried out as described for Dispersion 1, but using 22.80 kg deionised water and 30.73 kg of the silicon-aluminium mixed oxide containing 66 wt. % aluminium oxide and using a total of 2.34 kg of 25 percent, aqueous tetramethylammonium hydroxide solution instead of KOH solution.

The preliminary dispersion and dispersion using a Rotor/Stator continuous homogeniser were carried out until a mixed oxide content of approximately 35 wt. % was obtained at a pH value of approximately 10.5. Subsequently further mixed oxide was added, the grinding by means of the high-pressure homogeniser being carried out initially at a pressure of 100 MPa. At the same time, the dispersion was returned to the batch tank at a flow rate of 3 l/min. When the mixed oxide content was approximately 45 wt. % or above, grinding was further intensified by increasing the pressure to 250 MPa, the dispersion always being returned to the batch tank. As a result of further addition of the powder and adjustment of the pH, finally a concentration of mixed oxide of 55 wt. % was obtained at a pH value of 10.5, a viscosity of 4 mPa·s and an average particle size $d_{50}$ of 70 nm.

Dispersion 4

The preparation was carried out as described for Dispersion 1, but using 29.0 kg deionised water and 10.00 kg of the silicon-aluminium mixed oxide containing 0.25 wt. % aluminium oxide.

A 25 percent by weight dispersion having a pH value of 10.5 and an average particle size $d_{50}$ of 110 nm was obtained.

The entire contents of European application number 01 104 269.4, filed on Feb. 23, 2001, is incorporated herein by reference.

Where a range is provided in this application, all values and sub-ranges between the stated values are expressly included.

The invention claimed is:

1. A process for producing an aqueous dispersion comprising dispersing with high shear energy a silicon-aluminium mixed oxide powder in an aqueous medium, the particles of said silicon-aluminium mixed oxide powder comprising from 0.1 to 99.9 wt. % $Al_2O_3$ and possessing a structure containing Si—O—Al-bonds and at least one selected from the group consisting of amorphous silicon dioxide regions, crystalline silicon dioxide regions, and combinations of amorphous and crystalline silicon dioxide regions, and crystalline aluminium oxide regions, said silicon-aluminum mixed oxide powder being selected from the group consisting of
   (1) a powder containing primary particles of amorphous silicon dioxide and crystalline aluminium oxide obtained from a flame hydrolysis process,
   (4) a powder containing a mullite structure having the chemical composition 3 $Al_2O_3 \times 2\ SiO_2$ up to 2 $Al_2O_3 \times SiO_2$,
   (5) a powder containing aluminium oxide doped with silicon dioxide or silicon dioxide obtained from a flame hydrolysis process and doped with aluminium oxide, and
   (4) a powder containing an aluminium oxide powder completely or partially coated with silicon dioxide or silicon dioxide powder completely or partially coated with aluminium oxide,
   wherein the energy input for the dispersion operation is at least 200 $KJ/m^3$.

2. The process for producing the aqueous dispersion according to claim 1, wherein the silicon-aluminum mixed oxide is dispersed and ground by pressurizing and releasing one or more aqueous dispersions of the silicon-aluminum mixed oxide through a nozzle of a device to cause the one or more aqueous dispersions to collide with one another or a section of a wall of the device.

* * * * *